(12) United States Patent
Zhang et al.

(10) Patent No.: US 12,082,005 B2
(45) Date of Patent: Sep. 3, 2024

(54) MEASUREMENT METHOD AND APPARATUS, AND DEVICE

(71) Applicant: HUAWEI TECHNOLOGIES CO., LTD., Shenzhen (CN)

(72) Inventors: Zhanzhan Zhang, Shanghai (CN); Jianqin Liu, Beijing (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 430 days.

(21) Appl. No.: 17/486,356

(22) Filed: Sep. 27, 2021

(65) Prior Publication Data

US 2022/0014943 A1    Jan. 13, 2022

Related U.S. Application Data

(63) Continuation of application No. PCT/CN2020/081832, filed on Mar. 27, 2020.

(30) Foreign Application Priority Data

Mar. 29, 2019  (CN) .................. 201910253428.X

(51) Int. Cl.
*H04W 24/02* (2009.01)
*H04W 52/02* (2009.01)

(52) U.S. Cl.
CPC ....... *H04W 24/02* (2013.01); *H04W 52/0212* (2013.01)

(58) Field of Classification Search
None
See application file for complete search history.

(56) References Cited

U.S. PATENT DOCUMENTS

2009/0047958 A1    2/2009  Rimhagen et al.
2013/0130679 A1*   5/2013  Naka ............... H04W 48/06
                                                    455/433

(Continued)

FOREIGN PATENT DOCUMENTS

CN    102761897 A    10/2012
CN    103220702 A    7/2013

(Continued)

OTHER PUBLICATIONS

R2-1904206, Sony, RRM measurements for UE power saving, 3GPP Tsg Ran WG2 Meeting# 105bis, Xian, China, Apr. 8-12, 2019, total 3 pages.
R1-1901711, vivo, UE power saving in RRM Measurements, 3GPP TSG RAN WG1 #96, Athens, Greece, 25th Feb.-Mar. 1, 2019, total 18 pages.

(Continued)

*Primary Examiner* — Phirin Sam
(74) *Attorney, Agent, or Firm* — HAUPTMAN HAM, LLP

(57) ABSTRACT

This application discloses a measurement method and apparatus, and a device. The method includes: the terminal device divides all neighbors detected on a same measurement frequency into at least two measurement groups, and performs RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

18 Claims, 6 Drawing Sheets

201

A terminal device divides all neighboring cells detected on a same measurement frequency into at least two measurement groups

202

The terminal device performs RRM measurement separately on the at least two measurement groups based on an RRM measurement parameter corresponding to each measurement group

(56) References Cited

U.S. PATENT DOCUMENTS

| | | | |
|---|---|---|---|
| 2016/0262118 A1* | 9/2016 | Kim | H04W 52/365 |
| 2016/0373971 A1* | 12/2016 | Kulal | H04W 36/0016 |
| 2017/0111831 A1* | 4/2017 | Xiao | H04B 17/336 |
| 2018/0323884 A1 | 11/2018 | Ku et al. | |
| 2019/0174532 A1* | 6/2019 | Damnjanovic | H04L 5/0044 |
| 2019/0174571 A1* | 6/2019 | Deenoo | H04W 36/30 |
| 2019/0342050 A1* | 11/2019 | Zhu | H04L 5/0048 |
| 2021/0058795 A1* | 2/2021 | Kwak | H04L 27/2613 |
| 2022/0132356 A1* | 4/2022 | Jung | H04W 36/0088 |
| 2022/0312251 A1* | 9/2022 | Yi | H04W 52/0274 |
| 2022/0345964 A1* | 10/2022 | Ramachandra | H04W 36/00835 |
| 2023/0113223 A1* | 4/2023 | Yi | H04L 5/0048 370/329 |
| 2023/0300758 A1* | 9/2023 | Kim | H04W 52/365 370/329 |

FOREIGN PATENT DOCUMENTS

| | | |
|---|---|---|
| CN | 103283279 A | 9/2013 |
| CN | 104303551 A | 1/2015 |

OTHER PUBLICATIONS

Extended European Search Report issued in corresponding European Application No. 20782610.8, dated Apr. 7, 2022, pp. 1-12.

3GPP TR 38.840 V1.0.0 (Mar. 2019), 3rd Generation Partnership Project; Technical Specification Group Radio Access Network; NR; Study on UE Power Saving (Release 16), total 70 pages.

International Search Report issued in corresponding International Application No. PCT/CN2020/081832, dated May 29, 2020, pp. 1-10.

* cited by examiner

MEASUREMENT METHOD AND APPARATUS, AND DEVICE

CROSS-REFERENCE TO RELATED APPLICATIONS

This application is a continuation of International Application No. PCT/CN2020/081832, filed on Mar. 27, 2020, which claims priority to Chinese Patent Application No. 201910253428.X, filed on Mar. 29, 2019. The disclosures of the aforementioned applications are hereby incorporated by reference in their entireties.

TECHNICAL FIELD

The present invention relates to the field of communications technologies, and in particular, to a measurement method and apparatus, and a device.

BACKGROUND

As various application programs and displays of user equipment (user equipment, UE) increase, UE power consumption control has become a problem that urgently needs to be resolved in the prior art. During communication, the UE generally needs to perform radio resource management (radio resource management, RRM) measurement. In the RRC_IDLE (RRC_IDLE) and RRC_INACTIVE (RRC_INACTIVE) modes, various RRM measurement parameters are configured through system information (system information, SI); and in the RRC_CONNECTED (RRC_CONNECTED) mode, the various RRM measurement parameters are configured through RRC signaling. One measurement frequency may be configured with one or more neighboring cell lists and a group of RRM measurement parameters. The specific RRM measurement parameters may be: a measurement time configuration of a synchronization signal/physical broadcast channel block (SS/PBCH block measurement time configuration, SMTC), a location of a synchronization signal/physical broadcast channel block (synchronization signal/physical broadcast channel block, SSB) to be measured (ssb-ToMeasure), and a configuration of received signal strength indicator (received signal strength indicator, RSSI) measurement (SS-RSSI-Measurement).

To reduce power consumption when the UE performs RRM measurement on a neighboring cell, a current solution mainly reduces a quantity of cells on which the UE performs neighboring cell measurement. Feasible implementations include:

For UE in the RRC_IDLE and RRC_INACTIVE modes, a network sets measurement thresholds SIntraSearchP and SIntraSearchQ. Srxlev and Squal are respectively used to represent values obtained through calculation after the UE measures reference signal received power (reference signal received power, RSRP) and reference signal received quality (reference signal received quality, RSRQ) of the serving cell. When the measurement result of the serving cell meets the following conditions: Srxlev>SIntraSearchP and Squal>SIntraSearchQ, the UE may choose not to perform measurement on an intra-frequency neighboring cell (intra-frequency neighboring cell) according to an existing protocol. However, when the foregoing conditions are not met, the UE is required by the existing protocol to measure the intra-frequency neighboring cell. Further, according to the prior art, a threshold SIntraSearchP2 is added besides the existing threshold SIntraSearchP. When a measurement result by the UE meets different threshold ranges, correspondingly, the UE needs to perform measurement on different quantities of neighboring cells. For example, when SIntraSearchP2<Srxlev<SIntraSearchP is met, measurement may be performed on some of the intra-frequency neighboring cells. When Srxlev<SIntraSearchP2 is met, measurement is performed on all the intra-frequency neighboring cells by the UE.

According to the RRM measurement solutions provided in the prior art, power consumption of RRM measurement of neighboring cells can be reduced to some extent by reducing neighboring cells that need to be measured. However, when a measurement result of a serving cell meets a specific threshold range, measurement may never be performed on some neighboring cells. When the neighboring cells on which measurement is not performed in time meet the conditions for cell reselection/handover, the UE cannot reselect/hand over these cells in time. This prolongs the cell reselection/handover delay, which greatly affects the mobility performance of the UE.

SUMMARY

The present invention provides a measurement method and apparatus and a device. According to the method and the apparatus provided in the present invention, a prior-art problem that a cell reselection/handover delay of a terminal device is prolonged because measurement may never be performed on some cells during RRM measurement.

According to a first aspect, a measurement method is provided. The method includes:

A terminal device divides all neighboring cells detected on a same measurement frequency into at least two measurement groups; and the terminal device performs RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

In the method provided in this embodiment, all the neighboring cells are divided into the at least two measurement groups, and RRM measurement is performed on each measurement group based on the corresponding RRM measurement parameter. For different RRM measurement parameters, there are different measurement periods, quantities of to-be-measured SSBs, and quantities of to-be-measured symbols when the terminal device measures corresponding measurement groups. Therefore, the terminal device has different corresponding power consumption when the terminal device implements RRM measurement for different measurement groups. In comparison with the prior art in which a quantity of to-be-measured cells is reduced during neighboring cell measurement, but a same set of RRM measurement parameters is uniformly used to perform RRM measurement, in this embodiment of this application, power consumption of RRM measurement can be reduced while all the neighboring cells are measured, to achieve a good effect of achieving both measurement efficiency and power consumption control.

The terminal device may divide all the neighboring cells into the at least two measurement groups based on an indication from a network device side or a manner preset in a protocol. Specific implementations may be as follows:

In an optional implementation, that a terminal device divides all neighboring cells detected on a same measurement frequency into at least two measurement groups includes:

dividing all the neighboring cells detected on the same measurement frequency into the at least two measurement groups based on grouping configuration information sent by a network side device.

In another manner of obtaining the measurement groups through grouping, the terminal device divides all the neighboring cells detected on the same measurement frequency into the at least two measurement groups based on a preset quantity of groups and a preset grouping method on each measurement frequency.

In a manner in which the network side device sends the grouping configuration information for grouping, the network device side may group all the neighboring cells into different measurement groups in a targeted manner based on a real-time grouping requirement and a real-time status of the terminal device, to achieve flexible configuration.

In the manner in which the network side device sends the grouping configuration information, the grouping configuration information may include a plurality of cases, and implementations may be as follows:

In an optional implementation 1, the grouping configuration information includes neighboring cell quantity information indicating a quantity of neighboring cells in each measurement group, and the method includes:

When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

In this embodiment, the quantity of neighboring cells included in each measurement group may be determined in the foregoing manner, but to further group all the neighboring cells into the at least two measurement groups, the grouping method may be further detailed based on the quantity with reference to the following manners:

Method 1: After the quantity of neighboring cells in each measurement group is determined based on the neighboring cell quantity information, all the neighboring cells detected by the terminal device on the same measurement frequency may be randomly divided into the at least two measurement groups based on the quantity in the neighboring cell quantity information.

Method 2: The terminal device obtains one or more measurement results obtained by performing RRM measurement on all the neighboring cells detected on the same measurement frequency.

Then, based on the one or more measurement results and the neighboring cell quantity information, all the neighboring cells detected by the terminal device on the same measurement frequency are divided into the at least two measurement groups based on the quantity in the neighboring cell quantity information, and after the grouping, a difference between measurement results of neighboring cells in a same measurement group falls within a specified range.

In an optional implementation 2, the grouping configuration information includes one or more thresholds, the one or more thresholds are used to indicate a plurality of threshold intervals, and that the terminal device divides all the neighboring cells detected on the same measurement frequency into the at least two measurement groups based on grouping configuration information sent by a network side device includes:

the terminal device obtains the one or more measurement results obtained by performing RRM measurement on all the neighboring cells detected on the same measurement frequency; and the terminal device divides all the detected neighboring cells into the at least two measurement groups based on the one or more measurement results and the plurality of threshold intervals, where measurement results of neighboring cells in a same measurement group correspond to a same threshold interval.

In an optional implementation 3, the grouping configuration information includes one or more offset values, the one or more offset values are used to indicate a plurality of difference ranges, and the dividing all the neighboring cells detected on the same measurement frequency into the at least two measurement groups based on grouping configuration information sent by a network side device includes:

the terminal device determines a first measurement result of RRM measurement on a serving cell and second measurement results of all the neighboring cells detected on the same measurement frequency; and the terminal device groups, into a same measurement group, cells whose differences between the second measurement result and the first measurement result fall within a same difference range.

In an optional implementation, if only the quantity of neighboring cells in each measurement group is determined in the grouping configuration information in the foregoing implementations, neighboring cell grouping may be further performed after the quantity of neighboring cells and a measurement result of a neighboring cell are comprehensively considered. Specifically, before the terminal device divides all the neighboring cells detected on the same measurement frequency into the at least two measurement groups, the method may further include:

the terminal device obtains the one or more measurement results obtained by performing RRM measurement on all the neighboring cells detected on the same measurement frequency, so that when the terminal device divides all the detected neighboring cells into the at least two measurement groups based on the one or more measurement results, a difference between measurement results of neighboring cells in a same measurement group falls within a specified range.

In this embodiment, each measurement group is obtained through grouping with reference to the quantity of neighboring cells in the measurement group and a measurement result of each neighboring cell, so that neighboring cells with similar measurement results are divided into a same measurement group. The RRM measurement parameter may be set more optimally, and the terminal device can perform cell selection, cell reselection, or cell handover in a timely manner when a cell reselection/handover condition is met.

In an optional implementation, a solution in which a measurement group is obtained through grouping based on a measurement result of a neighboring cell is used to avoid a case in which all the neighboring cells are divided into a same measurement group due to very similar measurement results. In this method, the grouping configuration information further includes a maximum quantity of cells in a specific measurement group, and the specific measurement group is a measurement group on which the terminal device performs RRM measurement with highest power consumption among the at least two measurement groups.

In this implementation, an RRM measurement parameter corresponding to the specific measurement group may be an RRM measurement parameter that is used for normal measurement and that is specified in an existing protocol, and the normal measurement indicates measurement performed by the terminal device based on the RRM measurement parameter configured in the existing protocol (namely, RRM measurement with high power consumption). After the terminal device divides the neighboring cells into groups in this implementation, measurement performed by the terminal device on another group of neighboring cells other than the specific measurement group may be referred to as relaxed RRM measurement (namely, RRM measurement with low power consumption). A neighboring cell in the specific measurement group is a neighboring cell that most likely meets a cell selection, reselection, or handover condition. When a quantity of neighboring cells in the specific measurement group is set, it can be ensured that the terminal device can successfully perform cell selection, cell reselection, or cell handover, and power consumption when the terminal device performs RRM measurement can also be reduced.

In an optional implementation, there may be a plurality of manners of triggering the terminal device to perform RRM measurement based on grouping in the foregoing implementations:

B1. The terminal device receives indication information sent by the network side device, where the indication information indicates the terminal device to perform RRM measurement separately on the at least two measurement groups based on the RRM measurement parameter corresponding to each measurement group.

B2. When the network side device sends the grouping configuration information to the terminal device, the terminal device detects whether the grouping configuration information is received. If the grouping configuration information is received, the terminal device divides all the neighboring cells into groups based on the grouping configuration information, and then performs RRM measurement separately on the at least two measurement groups based on the RRM measurement parameter corresponding to each measurement group.

B3. When the terminal device determines that the measurement result of the RRM measurement on the serving cell is greater than a first specified threshold, the terminal device groups all the neighboring cells detected on the same measurement frequency into the at least two measurement groups.

B4. When the terminal device determines that a difference between measurement results of two consecutive times of RRM measurement on the serving cell is less than a second specified threshold, the terminal device divides all the neighboring cells detected on the same measurement frequency into the at least two measurement groups.

In the foregoing triggering manners, the terminal device may select a proper manner in real time to perform RRM measurement, so that it can be ensured that the terminal device can perform cell selection, cell reselection, or cell handover in a timely manner when the terminal device may enter a new cell, and power consumption of the terminal device can also be effectively controlled.

In an optional implementation, the RRM measurement parameter in the foregoing implementations includes at least one of a measurement period, an SMTC period, a measurement moment in an SMTC window, a maximum quantity of to-be-reported beams in each cell, a parameter indicating whether to report a beam-level measurement result, and a report interval.

In all the foregoing implementations, if neighboring cells are divided into different measurement groups based on the one or more measurement results of the neighboring cells, during setting of the RRM measurement parameter corresponding to each measurement group, a measurement group with a good measurement result may correspond to an RRM measurement parameter corresponding to high power consumption of the terminal device, and a measurement group with a bad measurement result may correspond to an RRM measurement parameter corresponding to low power consumption.

According to a second aspect, a measurement method is provided. The method includes:

A network side device sends grouping configuration information to a terminal device, where the grouping configuration information is used to indicate the terminal device to divide all neighboring cells detected on a same measurement frequency into at least two measurement groups, the at least two measurement groups are in a one-to-one correspondence with at least two RRM measurement parameters, and the terminal device has different power consumption when performing RRM measurement on the at least two measurement groups based on the corresponding RRM measurement parameters.

In an optional implementation, the method further includes:

When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

In an optional implementation, the grouping configuration information includes one or more thresholds, the one or more thresholds are used to indicate a plurality of threshold intervals, and the terminal device divides all the neighboring cells into the at least two measurement groups based on the grouping configuration information and the one or more measurement results obtained by performing RRM measurement on all the neighboring cells detected on the same measurement frequency, where measurement results of neighboring cells in a same measurement group correspond to a same threshold interval.

In an optional implementation, the grouping configuration information includes one or more offset values, the one or more offset values are used to indicate a plurality of difference ranges, and the terminal device groups, into a same measurement group based on the one or more offset values, cells whose differences between a first measurement result of RRM measurement on a serving cell of the terminal device and second measurement results of all the neighboring cells detected on the same measurement frequency fall within a same difference range.

In an optional implementation, the grouping configuration information further includes a maximum quantity of cells in a specific measurement group, and the specific measurement group is a measurement group on which the terminal device performs RRM measurement with highest power consumption among the at least two measurement groups.

In an optional implementation, the at least two measurement groups correspond to different RRM measurement parameters, and the RRM measurement parameter includes at least one of a measurement period, an SMTC period, a measurement moment in an SMTC window, a maximum quantity of to-be-reported beams in each cell, a parameter indicating whether to report a beam-level measurement result, and a report interval.

All the implementable manners of the second aspect correspond to the implementable manners provided in the first aspect. Therefore, beneficial effects of all the implementations described in the first aspect and mutual combination solutions of features of the implementations may be used to explain the implementations of the second aspect. Therefore, details are not described herein again.

According to a third aspect, a terminal device is provided. The terminal device includes:
a memory, configured to store instructions; and
a processor, configured to read the instructions in the memory, to perform the following process:
dividing all neighboring cells detected on a same measurement frequency into at least two measurement groups; and
performing RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

In an optional implementation, the processor is specifically configured to divide all the neighboring cells detected on the same measurement frequency into the at least two measurement groups based on grouping configuration information sent by a network side device.

In an optional implementation, the terminal device includes:
When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

In an optional implementation, the grouping configuration information includes one or more thresholds, the one or more thresholds are used to indicate a plurality of threshold intervals, and the processor is specifically configured to: obtain the one or more measurement results obtained by performing RRM measurement on all the neighboring cells detected on the same measurement frequency, and divide all the neighboring cells into the at least two measurement groups based on the one or more measurement results and the plurality of threshold intervals, where measurement results of neighboring cells in a same measurement group correspond to a same threshold interval.

In an optional implementation, the grouping configuration information includes one or more offset values, the one or more offset values are used to indicate a plurality of difference ranges, and the processor is specifically configured to: determine a first measurement result of RRM measurement on a serving cell and second measurement results of all the neighboring cells detected on the same measurement frequency, and group, into a same measurement group, cells whose differences between the second measurement result and the first measurement result fall within a same difference range.

In an optional implementation, the processor is specifically configured to divide all the neighboring cells detected on the same measurement frequency into the at least two measurement groups based on a preset quantity of groups and a preset grouping method on each measurement frequency.

In an optional implementation, the processor is further configured to: before the terminal device divides all the neighboring cells detected on the same measurement frequency into the at least two measurement groups, obtain, by the terminal device, the one or more measurement results obtained by performing RRM measurement on all the neighboring cells detected on the same measurement frequency, so that when the terminal device divides all the detected neighboring cells into the at least two measurement groups based on the one or more measurement results, a difference between measurement results of neighboring cells in a same measurement group falls within a specified range.

In an optional implementation, the grouping configuration information further includes a maximum quantity of cells in a specific measurement group, and the specific measurement group is a measurement group on which the terminal device performs RRM measurement with highest power consumption among the at least two measurement groups.

In an optional implementation, the processor is specifically configured to: when determining that a measurement result of RRM measurement on the serving cell is greater than a first specified threshold, divide all the neighboring cells detected on the same measurement frequency into the at least two measurement groups, or when determining that a difference between measurement results of two consecutive times of RRM measurement on the serving cell is less than a second specified threshold, divide, by the terminal device, all the neighboring cells detected on the same measurement frequency into the at least two measurement groups.

In an optional implementation, the RRM measurement parameter includes at least one of a measurement period, an SMTC period, a measurement moment in an SMTC window, a maximum quantity of to-be-reported beams in each cell, a parameter indicating whether to report a beam-level measurement result, and a report interval.

According to a fourth aspect, a network side device is provided, and includes:
 a memory, configured to store instructions; and
 a processor, configured to read the instructions in the memory, to perform the following process:
 sending grouping configuration information to a terminal device, where the grouping configuration information is used to indicate the terminal device to divide all neighboring cells detected on a same measurement frequency into at least two measurement groups, the at least two measurement groups are in a one-to-one correspondence with at least two RRM measurement parameters, and the terminal device has different power consumption when performing RRM measurement on the at least two measurement groups based on the corresponding RRM measurement parameters.

In an optional implementation, the network side device includes:

When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

In an optional implementation, the grouping configuration information includes one or more thresholds, the one or more thresholds are used to indicate a plurality of threshold intervals, and the terminal device divides all the neighboring cells into the at least two measurement groups based on the grouping configuration information and the one or more measurement results obtained by performing RRM measurement on all the neighboring cells detected on the same measurement frequency, where measurement results of neighboring cells in a same measurement group correspond to a same threshold interval.

In an optional implementation, the grouping configuration information includes one or more offset values, the one or more offset values are used to indicate a plurality of difference ranges, and the terminal device groups, into a same measurement group based on the one or more offset values, cells whose differences between a first measurement result of RRM measurement on a serving cell of the terminal device and second measurement results of all the neighboring cells detected on the same measurement frequency fall within a same difference range.

In an optional implementation, the grouping configuration information further includes a maximum quantity of cells in a specific measurement group, and the specific measurement group is a measurement group on which the terminal device performs RRM measurement with highest power consumption among the at least two measurement groups.

In an optional implementation, the at least two measurement groups correspond to different RRM measurement parameters, and the RRM measurement parameter includes at least one of a measurement period, an SMTC period, a measurement moment in an SMTC window, a maximum quantity of to-be-reported beams in each cell, a parameter indicating whether to report a beam-level measurement result, and a report interval.

According to a fifth aspect, a terminal device is provided, and includes:
 a grouping unit, configured to divide all neighboring cells detected on a same measurement frequency into at least two measurement groups; and
 a measurement unit, configured to perform RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

According to a sixth aspect, a measurement apparatus is provided, and includes:
 an information determining unit, configured to determine grouping configuration information; and
 a sending unit, configured to send the grouping configuration information to a terminal device, where the grouping configuration information is used to indicate the terminal device to divide all neighboring cells detected on a same measurement frequency into at least two measurement groups, the at least two measurement groups are in a one-to-one correspondence with at least two RRM measurement parameters, and the terminal device has different power consumption when performing RRM measurement on the at least two measurement groups based on the corresponding RRM measurement parameters.

According to a seventh aspect, a computer-readable storage medium is provided. The computer-readable storage medium includes a computer program, and when the computer program is run on a computer, the computer is enabled to perform the method according to any one of the implementations provided in the first aspect and the second aspect.

According to an eighth aspect, a computer program product including instructions is provided. When the instructions are run on a computer, the computer is enabled to perform the method according to any one of the implementations provided in the first aspect and the second aspect.

DESCRIPTION OF EMBODIMENTS

Figure 1:
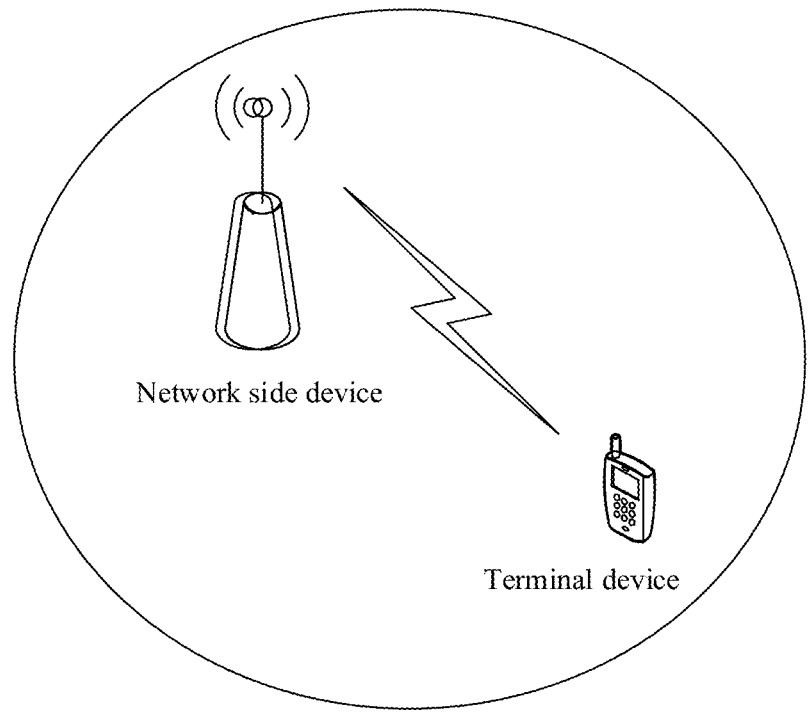
FIG. 1 is a schematic diagram depicting a structure of a simple system used for a method according to an embodiment of this application.

Mobile RRM measurement in the prior art aims to enable terminal devices in the RRC_IDLE (RRC_IDLE) and RRC_INACTIVE (RRC_INACTIVE) modes to perform cell selection/reselection (cell selection/reselection), and to enable a terminal device in the RRC_CONNECTED (RRC_CONNECTED) mode to perform cell handover. The RRM measurement is to meet a requirement of a communications system for mobility of the terminal device, so that the terminal device can perform cell selection, cell reselection, or cell handover in a timely manner when entering a new cell. Therefore, current RRM measurement is performed periodically. Specific power consumption is caused when the terminal device periodically performs RRM measurement. When the terminal device is in some conditions, for example, when mobility of the terminal device is relatively low or the terminal device is at a center location of a cell, the terminal device does not move to a new cell in a short period of time. Therefore, RRM measurement is unnecessary, and unnecessary power consumption is caused. In a current 3GPP protocol, a design for reducing power consumption is made for RRM measurement. Because RRM measurement is divided into measurement on a serving cell and measurement on a neighboring cell, when a measurement result of the serving cell is greater than a specified threshold, the terminal device may measure only the serving cell and does not measure the neighboring cell, and the terminal device starts to measure the neighboring cell only when the measurement result of the serving cell is less than the specified threshold.

A quantity of neighboring cells that can be detected by the terminal device at a specific moment is limited, and there are good measurement and bad measurement on neighboring cells. Measurement results of some neighboring cells are relatively good, and measurement results of some neighboring cells are relatively bad. Obviously, a neighboring cell with a relatively bad measurement result is of relatively low importance, and a probability that the terminal device is handed over to the neighboring cell with the relatively bad measurement result in a short period of time is less than a probability that the terminal device is handed over to a neighboring cell with a relatively good measurement result. Therefore, based on such a feature of RRM measurement, embodiments of this application provide a measurement method when both measurement performance and power consumption control are considered. A general idea of the method is as follows: RRM measurement may be relaxed for the neighboring cell with the relatively bad measurement result, to reduce power consumption of the terminal device. In comparison with the prior art in which a same RRM measurement parameter is uniformly configured for all cells on a same measurement frequency and therefore the terminal device performs, regardless of whether a measurement result of a neighboring cell is good or bad, same measurement behavior on all the cells detected at the same frequency, in the method provided in the embodiments of this application, all neighboring cells can be measured, and power consumption of the terminal device can also be controlled.

To describe a specific implementation process of the solution provided in the present invention more clearly and in detail, the following further describes the method provided in the embodiments of this application in detail with reference to specific examples.

The technical solutions of the embodiments of this application may be applied to various communications systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a 5th generation (5th generation, 5G) system, or a new radio (new radio, NR) system.

The method provided in the embodiments of this application may be applicable to any communications system in which a communications entity configures an RRM measurement parameter of a neighboring cell for the terminal device, for example, a fifth-generation wireless communications system NR (New radio) system, a narrowband internet of things (NB-IoT, narrowband internet of things) system, a machine type communication (MTC, Machine Type Communication) system, and a next-generation communications system in the future.

In a system to which the method provided in the embodiments of this application is applicable, a most simplified communications system may include one network side device and one terminal device (as shown in FIG. 1). Certainly, in a specific actual environment, the network side device may be a base station, and the terminal device may be a mobile terminal device. In the communications system, the network side device sends information to the terminal device through a downlink channel, and the terminal device sends information to the network side device through an uplink channel. In this system:

The network side device is a network-side communications entity that is configured to send or receive a signal. The network side device may be a base station, and may have different names in different communications systems. For example, a base station in the LTE system is referred to as an eNodeB, and a base station in the NR system is referred to as a gNodeB.

The terminal device may be any terminal. For example, the terminal device may be a mobile phone, a tablet computer, a wearable device, or a sensor device.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

In the embodiments of this application, the terminal device may be alternatively a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on a body or integrated into clothing or an accessory of a user. The wearable device is not merely a hardware device, and further implements powerful functions through software support, data exchange, or cloud interaction. In a broad sense, the wearable intelligent device includes a full-function and large-size device such as a smartwatch or smart glasses that implement all or some functions without relying on a smartphone, and a device that focuses on only a specific type of application function and needs to be used in cooperation with another device such as a smartphone, for example, various smart bands and smart jewelry that are used to monitor a physical sign.

In addition, in the embodiments of this application, the terminal device may be alternatively a terminal device in an internet of things (internet of things, IoT) system. The IoT is an important component of future information technology development, and the IoT is mainly featured by an intelligent network in which an object is connected to a network by using a communications technology to realize a human-machine interconnection and an interconnection between things.

In the embodiments of this application, in an IoT technology, a narrowband (narrow band) NB technology may be used to implement mass connections, deep coverage, and power saving of a terminal. For example, an NB includes only one resource block (resource block, RB). In other words, bandwidth of the NB is only 180 KB. To implement mass connections, terminals need to be discrete during access. According to a communication method in the embodiments of this application, a problem of congestion existing when massive terminals access a network by using the NB in the IoT technology can be effectively resolved.

In addition, in this application, the terminal device may further include sensors such as an intelligent printer, a train detector, and a gas station. Main functions include collecting data (some terminal devices), receiving control information and downlink data from a network device, sending an electromagnetic wave, and transmitting uplink data to the network device.

In the embodiments of this application, the network device may be a device that is configured to communicate with the terminal device, and the network device may be a base transceiver station (base transceiver station, BTS) in a global system for mobile communications (global system for mobile communications, GSM) system or code division multiple access (code division multiple access, CDMA), may be a NodeB (NodeB, NB) in a wideband code division multiple access (wideband code division multiple access, WCDMA) system, may be an evolved NodeB (evolved NodeB, eNB or eNodeB) in the LTE system, or may be a radio controller in a cloud radio access network (cloud radio access network, CRAN) scenario. Alternatively, the network device may be a relay station, an access point, a vehicle-mounted device, a wearable device, a network device in a future 5G network, a network device in a future evolved PLMN network, or the like, may be an access point (access point, AP) in a WLAN, or may be a gNB in the new radio (new radio, NR) system. This is not limited in the embodiments of this application.

Figure 2:
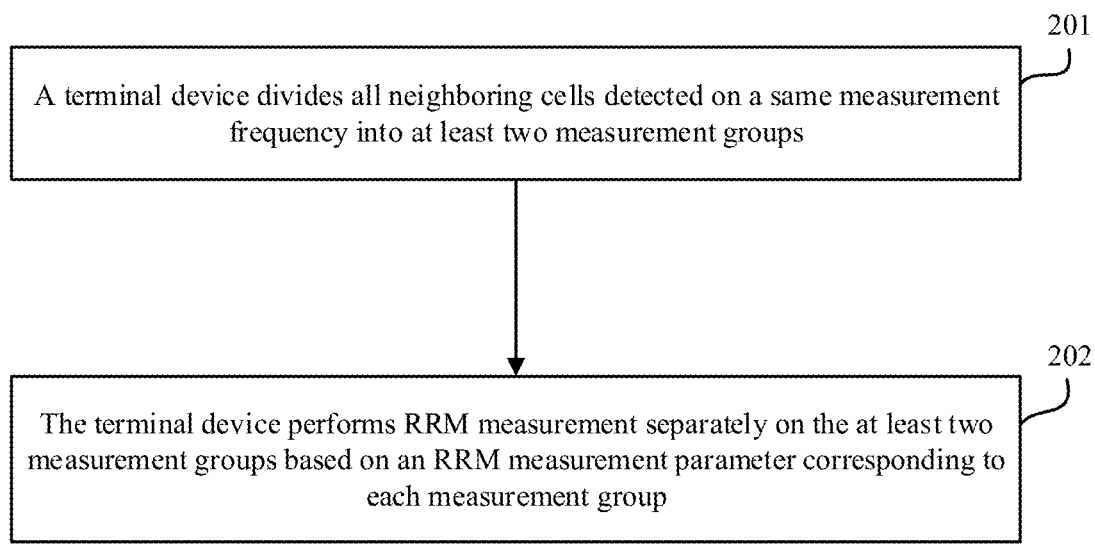
FIG. 2 is a schematic flowchart of a measurement method according to an embodiment of this application.

As shown in FIG. 2, based on a system architecture to which the foregoing embodiments of this application are applicable, the following further provides detailed analyses and descriptions of a measurement method provided in an embodiment of this application. Specifically, the method provided in this embodiment of this application may include the following steps.

Step 201: A terminal device divides all neighboring cells detected on a same measurement frequency into at least two measurement groups.

In this embodiment of this application, the terminal device may divide all the neighboring cells detected on the same measurement frequency into the at least two measurement groups based on information obtained in a plurality of manners, including:

Manner 1: Before the terminal device obtains the measurement groups through grouping, a network side device sends grouping configuration information to the terminal device, and the terminal device divides all the neighboring cells into the at least two measurement groups based on the grouping configuration information. The grouping configuration information is used to indicate the terminal device to divide all the neighboring cells detected on the same measurement frequency into the at least two measurement groups, the at least two measurement groups are in a one-to-one correspondence with at least two RRM measurement parameters, and the terminal device has different power consumption when performing RRM measurement on the at least two measurement groups based on the corresponding RRM measurement parameters.

Manner 2: The terminal device divides all the neighboring cells detected on the same measurement frequency into the at least two measurement groups based on a preset quantity of groups and a preset grouping method on each measurement frequency.

Step 202: Perform RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

In this instance, the terminal device may perform RRM measurement in a manner specified in an existing protocol. Certainly, a specific triggering manner may also be used to trigger the terminal device to divide the neighboring cells and then perform RRM measurement on each group of neighboring cells by using the method provided in this embodiment of this application.

There may be two specific triggering manners:

Manner 1: The network side device sends a message to the terminal device, and then the terminal device is triggered based on the message. Certainly, the message may be a specific message used to indicate the terminal device to perform RRM measurement by using the method provided in this embodiment of this application. In addition, to implement the method provided in this embodiment of this application, if the network side device sends, to the terminal device, information used to indicate the terminal device to divide the neighboring cells or information indicating to adjust a parameter, the terminal device may determine, after detecting the information, that execution of the RRM measurement method provided in this embodiment of this application needs to be triggered.

Manner 2: The terminal device determines, based on mobility of the terminal device, whether execution of RRM measurement by using the method provided in this embodiment of this application needs to be triggered. This may be specifically as follows:

When the terminal device determines that a measurement result of RRM measurement on a serving cell is greater than a first specified threshold, the terminal device divides all the neighboring cells detected on the same measurement frequency into the at least two measurement groups.

Alternatively, when the terminal device determines that a difference between measurement results of two consecutive times of RRM measurement on a serving cell is less than a second specified threshold, the terminal device divides all the neighboring cells detected on the same measurement frequency into the at least two measurement groups.

In this embodiment of this application, all the neighboring cells detected on the same measurement frequency are divided into the at least two measurement groups, and RRM measurement is performed on each measurement group based on a different RRM measurement parameter. The terminal device has different power consumption when the terminal device measures the measurement groups based on different RRM measurement parameters, so that power consumption of the terminal device can be effectively controlled.

In this embodiment of this application, to ensure that each measurement group corresponds to different power consumption of the terminal device and the power consumption is less than power consumption in a solution provided in the prior art, during setting of the RRM measurement parameter, a group of RRM measurement parameters corresponding to highest power consumption of the terminal device may be set to an RRM measurement parameter specified in the existing protocol, and the group of RRM measurement parameters may be used to perform RRM measurement on a neighboring cell with a good measurement result. In other words, a cell that is most likely to be selected by the terminal device is measured by using an RRM measurement parameter corresponding to high power consumption, and RRM measurement is performed, by using an RRM measurement parameter corresponding to low power consumption, on a cell that is unlikely to be selected by the terminal device. In this manner, it can be ensured that RRM measurement is performed on all the neighboring cells, and in addition, when the terminal device is handed over between neighboring cells, RRM measurement is performed, in a manner corresponding to low power consumption, on a cell with a low probability of being selected, to achieve a balance between accurate measurement and power consumption saving.

In this embodiment, there are many RRM measurement parameters that affect power consumption of the terminal device. Several optional RRM measurement parameters are provided below. For ease of description, one measurement frequency is considered. It is assumed that all neighboring cells detected on the measurement frequency are divided into two measurement groups, and each measurement group corresponds to one group of RRM measurement parameters. A first RRM measurement parameter that corresponds to a measurement group corresponding to high power consumption of the terminal device may be an RRM measurement parameter that is used to perform RRM measurement and that is specified in a protocol in the prior art, and a second RRM measurement parameter corresponding to the other measurement group is an RRM measurement parameter that is obtained after the first RRM measurement parameter is adjusted while it is ensured that power consumption of the terminal device is reduced. The first RRM measurement parameter and the second RRM measurement parameter are of a same type, and a parameter type included in the first RRM measurement parameter and the second RRM measurement parameter is not displayed in this embodiment. In other words, the first RRM measurement parameter and the second RRM measurement parameter may include one or more of the following RRM measurement parameters. Based on different power consumption, specific parameters may be set as follows:

(1) Measurement period: A first measurement period in the first RRM measurement parameter may be obtained based on the existing protocol, and a second measurement period in the second RRM measurement parameter may be a measurement period obtained after the first measurement period is increased. A manner of obtaining the second measurement period may be as follows: A measurement period scale factor K (K is a positive integer) is configured in a network, and K is associated with the second measurement period. Thus, the second measurement period=the first measurement period×K. Certainly, the network side device may configure an independent parameter K for each measurement frequency, or may configure only one parameter K for all measurement frequencies.

(2) SMTC period: For each measurement frequency, M=2 SMTC periods are configured in the network. Herein, M indicates that all neighboring cells detected on one measurement frequency are divided into M groups. The terminal device performs RRM measurement on a first group of neighboring cells based on a first SMTC period, and the terminal device performs RRM measurement on a second group of neighboring cells based on a second SMTC period.

(3) Measurement moment in an SMTC window: The network side device configures two groups of parameters ssb-ToMeasure and ss-RSSI-Measurement for each measurement frequency. Herein, ssb-ToMeasure indicates a location of an SSB to be measured by the terminal device in the SMTC window, and ss-RSSI-Measurement indicates a slot location and a symbol location at which the terminal device measures an RSSI. A quantity of SSBs that are to be measured by the terminal device and that are indicated by ssb-ToMeasure configured in the second RRM measurement parameter is less than a quantity of SSBs that are to be measured by the terminal device and that are indicated by ssb-ToMeasure configured in the first RRM measurement parameter. For example, the SSBs that are to be measured by the terminal device and that are indicated by ssb-ToMeasure configured in the second RRM measurement parameter are a subset of the SSBs that are to be measured by the terminal device and that are indicated by ssb-ToMeasure configured in the first RRM measurement parameter. In comparison with ss-RSSI-Measurement configured in the first RRM measurement parameter, ss-RS SI-Measurement configured in the second RRM measurement parameter indicates the terminal device to perform RSSI measurement on a smaller quantity of slot locations and a smaller quantity of symbol locations.

(4) Maximum quantity of to-be-reported beams in each cell (maxNrofRS-IndexesToReport): For each measurement frequency, a maximum quantity of to-be-reported beams in the first RRM measurement parameter is greater than a maximum quantity of to-be-reported beams in the second RRM measurement parameter.

(5) Parameter indicating whether to report a beam-level measurement result (includeBeamMeasurements): For each measurement frequency, M such parameters are configured in the network. Alternatively, this parameter is not additionally configured. It is specified by default in the protocol that on each measurement frequency, it is determined, based on a configuration of this parameter, whether to report a beam-level measurement result for a first group of normally measured cells, and it is considered by default that a beam-level measurement result is not reported for other M−1 groups of cells on which RRM measurement with low power consumption is performed. The latter is used in this example.

(6) Report interval (reportInterval): A periodic report interval configured by the terminal device in a connected mode is an initial value of a periodical reporting timer. A report interval in the first RRM measurement parameter is less than a report interval in the second RRM measurement parameter.

The network side device may select a specific RRM measurement parameter based on a status of the terminal device (the status may include the RRC_IDLE mode, the RRC_INACTIVE mode, and the RRC_CONNECTED mode). For example, the report interval may be selected as an RRM measurement parameter in a case of the RRC_CONNECTED mode.

In an optional implementation, different manners of obtaining the measurement groups through grouping in step 201 are further described in detail below with reference to specific implementations.

For the manner 1, before the terminal device obtains the measurement groups through grouping, the network side device sends the grouping configuration information to the terminal device. Details may include:

(a1) The grouping configuration information includes neighboring cell quantity information indicating a quantity of neighboring cells in the measurement group, and a method may be as follows:

When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

The foregoing grouping manner is further described in detail with reference to a specific example (the following instance is described based on a case in which the terminal device is in the RRC_CONNECTED mode):

If the neighboring cells on each measurement frequency are divided into M measurement groups, M=2, and one piece of neighboring cell quantity information numCellsNormalRRM=4 is configured in the network, and if the neighboring cell quantity information is applicable to all measurement frequencies, all the neighboring cells on each measurement frequency are divided into two measurement groups, a quantity of neighboring cells in one measurement group is 4, and neighboring cells remained after four neighboring cells are subtracted from all the neighboring cells belong to the other measurement group. In this embodiment, a quantity of cells in a measurement group (which may be referred to as a first measurement group, and an RRM measurement parameter corresponding to the measurement group is referred to as a first RRM measurement parameter) corresponding to high power consumption is numCellsNormalRRM=4.

In this embodiment, the quantity of neighboring cells included in each measurement group may be determined in the foregoing manner, but to further divide all the neighboring cells into the at least two measurement groups, the grouping method may be further detailed based on the quantity with reference to the following manners:

Method 1: After the quantity of neighboring cells in each measurement group is determined based on the neighboring cell quantity information, all the neighboring cells detected by the terminal device on the same measurement frequency may be randomly divided into the at least two measurement groups based on the quantity in the neighboring cell quantity information.

Method 2: The terminal device obtains one or more measurement results obtained by performing RRM measurement on all the neighboring cells detected on the same measurement frequency.

Then, based on the one or more measurement results and the neighboring cell quantity information, all the neighboring cells detected by the terminal device on the same measurement frequency are divided into the at least two measurement groups based on the quantity in the neighboring cell quantity information, and after the grouping, a difference between measurement results of neighboring cells in a same measurement group falls within a specified range. In other words, neighboring cells with similar measurement results are divided into a same measurement group, and a difference between measurement results of any two neighboring cells in a same measurement group is not greater than a maximum value in differences between a measurement result of any neighboring cell in any other measurement group and the measurement results of the any two neighboring cells.

Figure 3:
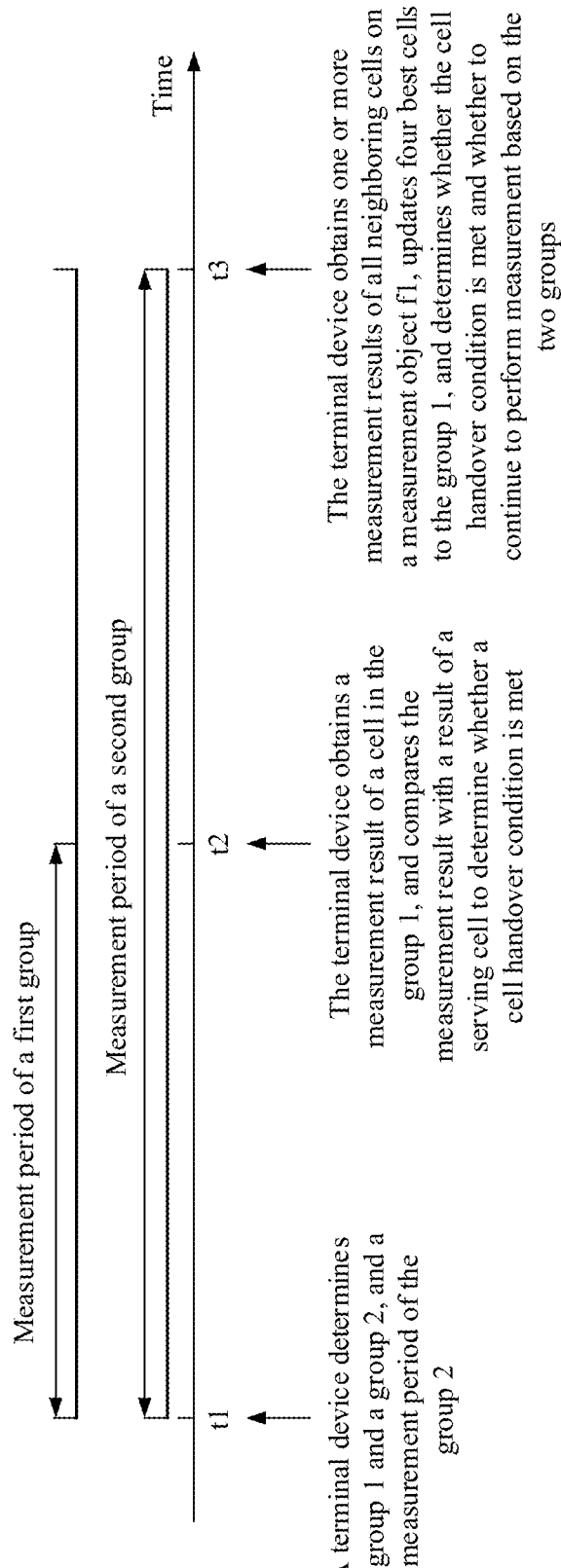
FIG. 3 is a schematic diagram of a part of a process of measuring, by a terminal device, a neighboring cell on a measurement object f1 when grouping is performed in a manner (a1) in a method according to an embodiment of this application.

As shown in FIG. 3, for the method 2, at a moment t1, the terminal device obtains one or more measurement results of all neighboring cells detected on a measurement frequency f1, and sorts the neighboring cells based on values of the one or more measurement results. A sorting amount may be specified by the network side device, may be specified by default in the protocol, or may be determined according to a specific rule. The sorting amount may be RSRP, RSRQ, or an SINR. Four (numCellsNormalRRM=4) neighboring cells with best measurement results are placed in the first measurement group, and the remaining cells are placed in a second measurement group.

After the moment t1, RRM measurement is performed on the first measurement group based on the RRM measurement parameter in the existing protocol (in other words, the first measurement group corresponds to the first RRM measurement parameter). In other words, the measurement period is not increased, and the like. RRM measurement with low power consumption may be performed on the second measurement group (in other words, the second measurement group corresponds to the second RRM measurement parameter). For example, the measurement period is increased to 2 times to perform RRM measurement.

At a moment t2, the terminal device obtains a measurement result of the neighboring cell in the first measurement group, and then compares the measurement result and the measurement result of the serving cell. The terminal device determines whether a cell handover condition is met, to determine whether to trigger event reporting. At a moment t3, the terminal device obtains the one or more measurement results of all the neighboring cells on the measurement frequency f1, sorts the neighboring cells based on the one or more measurement results, updates numCellsNormalRRM=4 cells with the best measurement results to the first measurement group, places the remaining cells in the second measurement group, determines whether the cell handover condition is met, to determine whether to trigger event reporting, and determines whether to continue to perform RRM measurement based on M=2 measurement groups.

When the terminal device obtains only the measurement result of the neighboring cell in the first measurement group, if event reporting or periodic reporting is triggered, the terminal device reports the measurement result of the neighboring cell in the first measurement group based on the existing protocol (in other words, a measurement reporting parameter included in the first RRM measurement parameter corresponding to the first measurement group). After the terminal device obtains the one or more measurement results of all the neighboring cells in the first measurement group and the second measurement group, if event reporting or periodic reporting is triggered and beam index reporting is involved, a maximum quantity of beam indexes reported in each neighboring cell in the first measurement group is greater than a maximum quantity of beam indexes reported in each neighboring cell in the second measurement group. If reporting of the beam-level measurement result is involved, whether a beam-level measurement result of each neighboring cell in the first measurement group is reported is determined based on the configured parameter includeBeamMeasurements, and a beam-level measurement result of the second measurement group is not reported by default.

In the foregoing grouping manner (a1), in this embodiment of this application, the terminal device may be triggered in the following manners to perform RRM measurement by using a cell grouping method:

Triggering method 1: The terminal device is triggered based on information sent by the network side device. For example, if the parameter numCellsNormalRRM and the parameter K are configured in the network, all terminal devices of Rel-16 and a later version perform RRM measurement based on the cell grouping method. If the network is configured based on the existing protocol, the terminal device performs, based on the existing protocol, same measurement behavior on all the neighboring cells on the same measurement frequency.

Triggering method 2: When it is determined, according to the prior art, that mobility of the terminal device is relatively low, or when the measurement result of the serving cell of the terminal device is greater than a specific threshold, this solution is triggered; otherwise, the terminal device normally measures all the neighboring cells based on the existing protocol. For example, an RSRP variation threshold may be configured in the network. When a difference between two consecutive RSRP measurement results of the serving cell is less than the threshold, this solution is triggered; otherwise, the terminal device normally measures all the neighboring cells. For another example, an RSRP threshold may be configured in the network. When an RSRP measurement result of the serving cell is greater than the threshold, this solution is triggered; otherwise, the terminal device normally measures all the neighboring cells.

(a2) The grouping configuration information includes one or more offset values (in this embodiment, one offset value may be a value obtained after a plurality of offset values configured in the network are calculated). The one or more offset values are used to indicate a plurality of difference ranges. That the terminal device divides all the neighboring cells detected on the same measurement frequency into the at least two measurement groups based on the grouping configuration information sent by the network side device includes:

the terminal device determines a first measurement result of RRM measurement on the serving cell and second measurement results of all the neighboring cells detected on the same measurement frequency; and the terminal device groups, into a same measurement group, cells whose differences between the second measurement result and the first measurement result fall within a same difference range.

In this embodiment, for the RRC_IDLE/INACTIVE mode, the network side device delivers the grouping configuration information by using a system message, and for the RRC_CONNECTED mode, the network device delivers the grouping configuration information by using RRC signaling. The method provided in this embodiment of this application is described in detail below with reference to a specific example.

Figure 4:
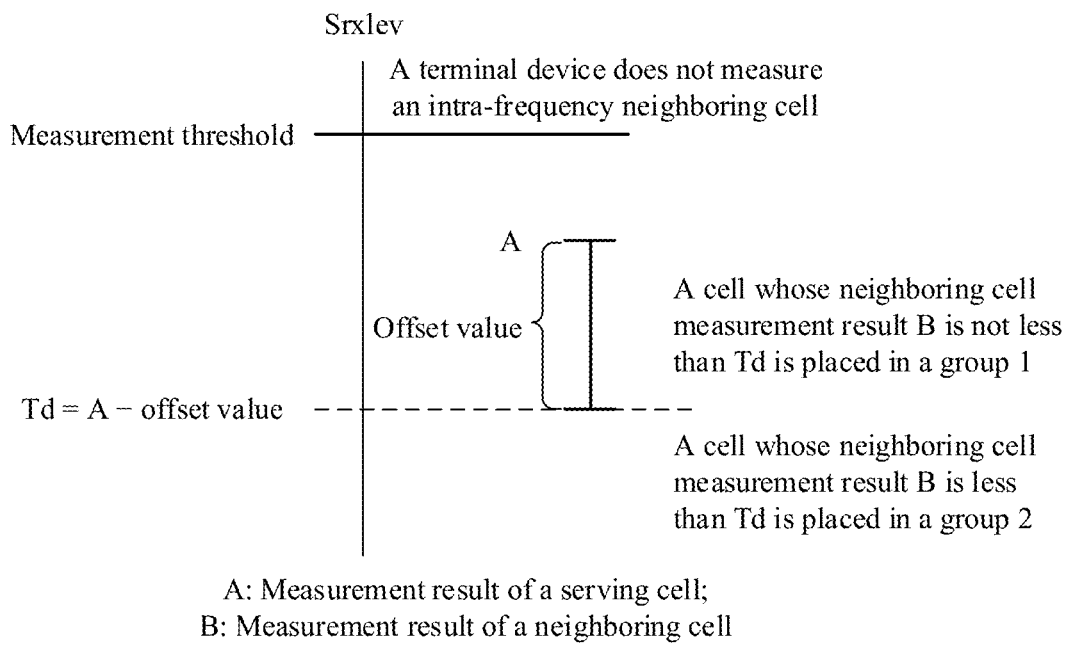
FIG. 4 is a schematic diagram of a method for obtaining a measurement group through grouping by using an offset value in a method according to an embodiment of this application.

If the network side device configures one offset value (offset value) in the grouping configuration information, the terminal device may determine to divide neighboring cells on each measurement frequency into two measurement groups. As shown in FIG. 4, for the RRC_IDLE/RRC_INACTIVE mode, the terminal device may divide the neighboring cells detected at the same frequency into two groups. Before dividing intra-frequency neighboring cells, the terminal device needs to obtain at least one or more measurement results of all the intra-frequency neighboring cells. In other words, before grouping, the terminal device still needs to perform same measurement behavior on all the intra-frequency neighboring cells, and RRM measurement in at least one measurement period is performed. In FIG. 4, A represents the measurement result of the serving cell, B represents a measurement result of the neighboring cell, Td represents a threshold obtained based on the measurement result A of the serving cell and the offset value configured in the network, and Td=A−offset. For an intra-frequency neighboring cell, if B≥Td, the neighboring cell is placed in the first measurement group; and if B<Td, the neighboring cell is placed in the second measurement group. In this method, all intra-frequency neighboring cells may be divided into two groups. It should be noted that the measurement result A of the serving cell and the measurement result B of the neighboring cell may be any one of RSRP, RSRQ, and an SINR, or may be values obtained after some offset values are subtracted from these measurement results. However, A and B need to be measurement results of a same type. For example, if A is RSRP, B cannot be RSRQ or an SINR.

In this embodiment of this application, all the intra-frequency neighboring cells may be divided into the first measurement group. The grouping configuration information further includes a maximum quantity of cells in a specific measurement group, and the specific measurement group is a measurement group on which the terminal device performs RRM measurement with highest power consumption among the at least two measurement groups. Details are as follows:

If RRM measurement is performed on the neighboring cell in the first measurement group based on the RRM measurement parameter in the existing protocol (in other words, the first measurement group corresponds to the first RRM measurement parameter), and RRM measurement is performed on the second measurement group based on an RRM measurement parameter corresponding to low power consumption (in other words, the second measurement group corresponds to the second RRM measurement parameter), to ensure a specific power consumption saving gain, the network side device may further control the terminal device to maintain a quantity of intra-frequency cells in the first measurement group, and a parameter maxCellsNormalRRM may be configured in the network. If more than maxCellsNormalRRM intra-frequency neighboring cells are allocated to the first measurement group, the terminal device places only maxCellsNormalRRM intra-frequency neighboring cells with best measurement results in the first measurement group, and still places remaining intra-frequency neighboring cells in the second measurement group.

Figure 5:
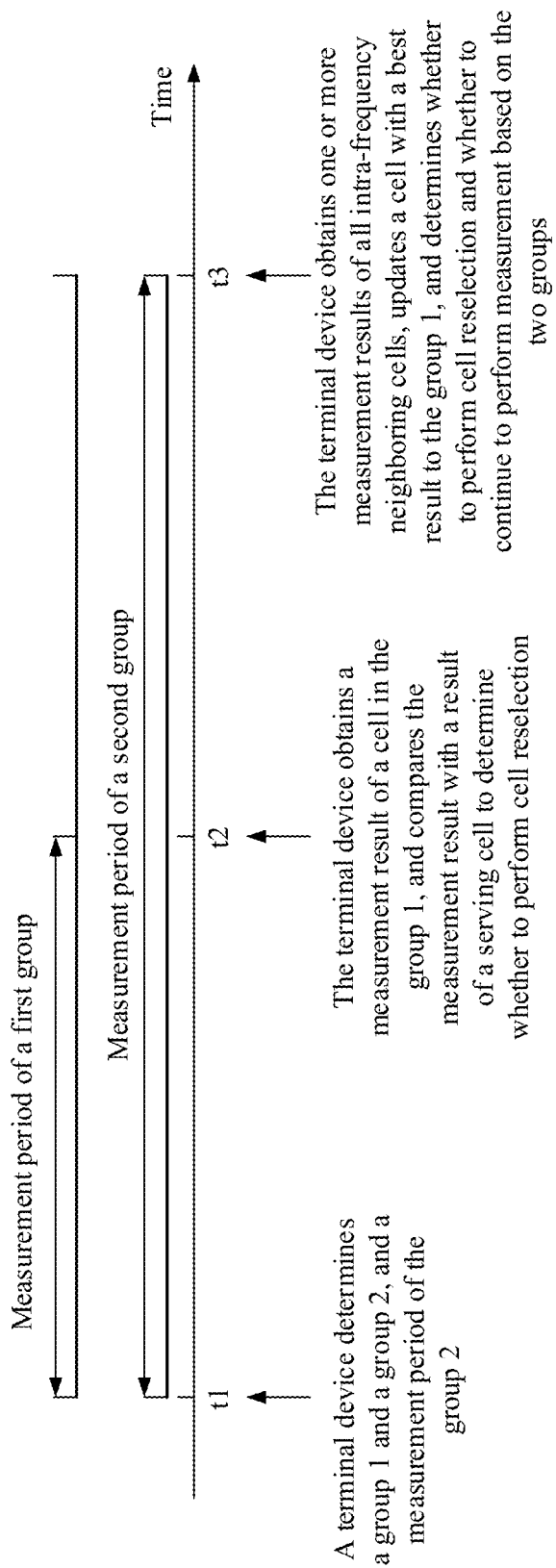
FIG. 5 is a schematic diagram of a part of a process of measuring, by a terminal device, intra-frequency neighboring cells when grouping is performed in a manner (a2) in a method according to an embodiment of this application.

FIG. 5 shows a part of a process of measuring, by the terminal device, intra-frequency neighboring cells. At the moment t1, the terminal device obtains one or more measurement results of all the intra-frequency neighboring cells, and divides the intra-frequency neighboring cells into two groups based on the grouping method described in the foregoing manner (a2). In this embodiment, K=2, and it indicates that a measurement period of the second measurement group is increased to two times of a measurement period of the first group. After the moment t1, the terminal device performs normal RRM measurement on the intra-frequency neighboring cells in the first measurement group (in other words, performs RRM measurement based on the RRM measurement parameter in the existing protocol), and the terminal device performs RRM measurement with low power consumption on the intra-frequency neighboring cells in the second measurement group, for example, increases the measurement period to two times to perform RRM measurement.

At the moment t2, the terminal device obtains measurement results of the intra-frequency neighboring cells in the first measurement group, and then compares the measurement results and the measurement result of the serving cell, so that the terminal device determines whether to perform cell reselection. At the moment t3, the terminal device obtains the one or more measurement results of all the intra-frequency neighboring cells, re-divides the intra-frequency neighboring cells again based on the grouping method described in the foregoing manner (a2), updates a cell with a best measurement result to the first measurement group, determines whether to perform cell reselection, and determines whether to continue to perform RRM measurement based on two groups.

In the foregoing example, grouping measurement is performed only on the intra-frequency neighboring cells. Similarly, the terminal device may also perform grouping measurement on inter-frequency neighboring cells. The terminal device may perform grouping measurement based on a method similar to that described above provided that the terminal device starts to measure different measurement frequencies. Details are not described herein again.

(a3) The grouping configuration information includes one or more thresholds, the one or more thresholds are used to indicate a plurality of threshold intervals, and that the terminal device divides all the neighboring cells detected on the same measurement frequency into the at least two measurement groups based on the grouping configuration information sent by the network side device includes:

the terminal device obtains the one or more measurement results obtained by performing RRM measurement on all the neighboring cells detected on the same measurement frequency; and the terminal device divides all the detected neighboring cells into the at least two measurement groups based on the one or more measurement results and the plurality of threshold intervals, where measurement results of neighboring cells in a same measurement group correspond to a same threshold interval.

Figure 6:
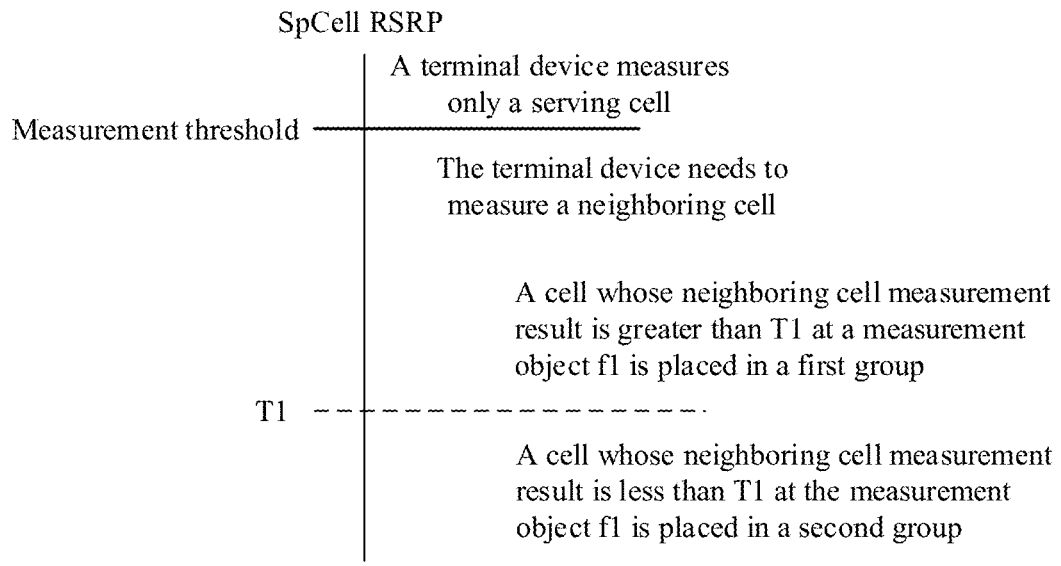
FIG. 6 is a schematic diagram of a method for obtaining a measurement group through grouping by using a threshold in a method according to an embodiment of this application.

As shown in FIG. 6, in this embodiment, if a threshold T1 is configured in the network, the terminal device may determine to divide the neighboring cells into two measurement groups. The threshold T1 may be an RSRP threshold, an RSRQ threshold, or an SINR threshold. In this example, the RSRP threshold may be used. When the terminal device needs to measure a neighboring cell, and for one measurement frequency, the terminal device has obtained one or more measurement results of all detected neighboring cells, the terminal device places a cell whose neighboring cell measurement result is greater than T1 in a first measurement group, and places a cell whose neighboring cell measurement result is less than T1 in a second measurement group. The measurement result of the neighboring cell and the threshold T1 are of a same type. The measurement result of the neighboring cell may be a value obtained through measurement, or may be a value obtained by subtracting a specific offset value from the value obtained through measurement. In this instance, the network side device may configure two groups of RRM measurement parameters for each measurement frequency of the terminal device by using RRC signaling.

A specific implementation of this implementation (a3) is similar to that of the manner (a2), and details are not described herein again.

For the manner 2, before obtaining the measurement groups through grouping, the terminal device obtains a preset quantity of groups and a preset grouping method on each measurement frequency, and then divides all the neighboring cells detected on the same measurement frequency into the at least two measurement groups based on the obtained quantity of groups and the grouping method.

In this embodiment, the grouping method does not need to be configured in the network, and the quantity of groups on each measurement frequency and the grouping method on each measurement frequency are specified by default in the protocol. For example, it is specified by default in the protocol that the intra-frequency neighboring cells are divided into two groups. If a quantity of all intra-frequency neighboring cells detected at a same frequency is N, a quantity of cells in a group (referred to as the first measurement group) on which normal RRM measurement is maintained is specified as ceil(½×N), and remaining cells are placed in the other group on which RRM measurement with low power consumption is performed.

In this example, it is assumed that it is specified by default in the protocol that intra-frequency neighboring cells and inter-frequency neighboring cells on all the measurement frequencies are divided into two groups. For the grouping method, for N1 intra-frequency neighboring cells detected on a same measurement frequency, a quantity of cells in a measurement group (referred to as the first measurement group, where the first measurement group is a first measurement group at a same frequency) on which RRM measurement is performed based on the RRM measurement parameter specified in the existing protocol is specified as ceil(½× N1), and remaining cells are placed in the other group on which RRM measurement with low power consumption is performed. For N2 inter-frequency neighboring cells detected on each inter-frequency measurement object, a quantity of cells in a measurement group (referred to as the first measurement group, where the first measurement group is a first measurement group on different frequencies) on which RRM measurement is performed based on the RRM measurement parameter specified in the existing protocol is specified as ceil(⅓×N2), and remaining cells are placed in the other group on which RRM measurement with low power consumption is performed.

Although information indicating grouping in this embodiment is directly specified based on the protocol, and does not need to be sent by the network side device, after the grouping configuration information is obtained in the manner 1, a specific grouping method for obtaining the measurement groups through grouping may be that in this embodiment. Therefore, all grouping methods in the foregoing manner 1 are covered in the grouping method in this embodiment.

Two groups of RRM measurement parameters are configured in the network for each measurement object (measurement frequency) of the terminal device by using RRC signaling.

A grouping measurement method of the terminal device and a method for updating a cell in each group are the same as the method provided in the foregoing manner 1, and details are not described herein again.

Figure 7:
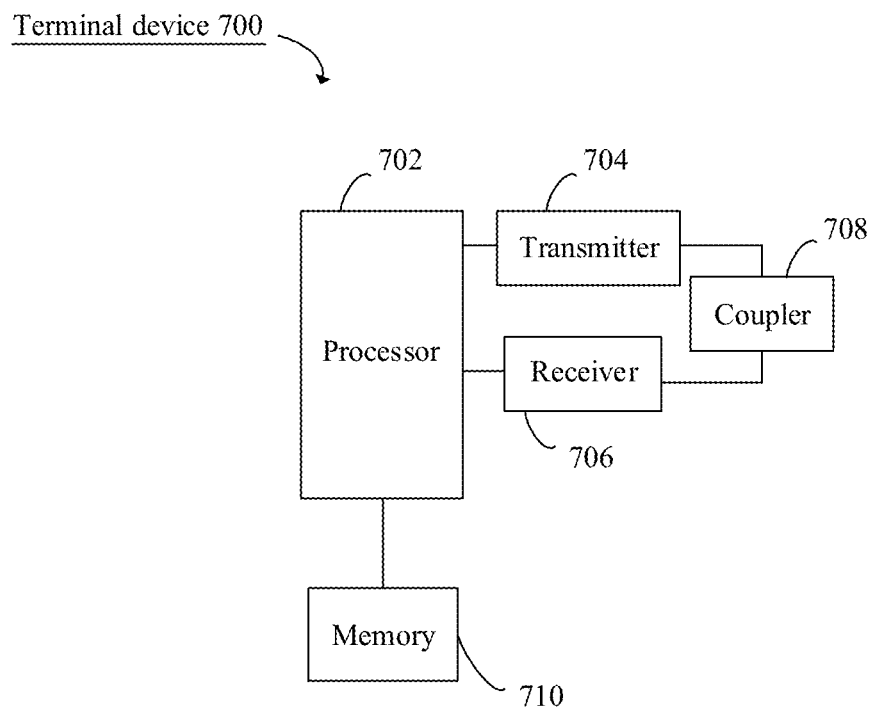
FIG. 7 is a schematic diagram depicting a structure of a terminal device according to an embodiment of this application.

As shown in FIG. 7, an embodiment of this application further provides a terminal device.

A terminal device 700 may include a processor 702, a transceiver (which may be a complete module formed after a transmitter 704 and a receiver 706 are integrated, or the transmitter 704 and the receiver 706 may respectively implement a transmit function and a receive function), a coupler 708, and a memory 710. In some embodiments of this application, these components may be connected by using a bus or in another manner. A bus connection is used as an example in FIG. 7.

The coupler 708 is configured to: divide communication signals into a plurality of paths, and allocate the paths of communication signals to a plurality of receivers 706.

The transmitter 704 is configured to transmit a communication signal generated by the processor 702, and the receiver 706 is configured to receive the communication signal. In a specific implementation, there may be one or more transmitters 704 or receivers 706.

The memory 710 is configured to store instructions. In specific implementation, the memory 710 may be a read-only memory (read-only memory, ROM), and the read-only memory may be configured to store instructions.

The processor 702 is configured to perform radio channel management. In this embodiment of this application, the processor 702 may be further configured to invoke the instructions stored in the memory 710, to perform the following steps:

dividing all neighboring cells detected on a same measurement frequency into at least two measurement groups; and performing RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

In an optional implementation, the processor is specifically configured to divide all the neighboring cells detected on the same measurement frequency into the at least two measurement groups based on grouping configuration information sent by a network side device.

In an optional implementation, the terminal device includes:

When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

In an optional implementation, the grouping configuration information includes one or more thresholds, the one or more thresholds are used to indicate a plurality of threshold intervals, and the processor is specifically configured to: obtain one or more measurement results obtained by performing RRM measurement on all the neighboring cells detected on the same measurement frequency, and divide all the neighboring cells into the at least two measurement groups based on the one or more measurement results and the plurality of threshold intervals, where measurement results of neighboring cells in a same measurement group correspond to a same threshold interval.

In an optional implementation, the grouping configuration information includes one or more offset values, the one or more offset values are used to indicate a plurality of difference ranges, and the processor is specifically configured to: determine a first measurement result of RRM measurement on a serving cell and second measurement results of all the neighboring cells detected on the same measurement frequency, and group, into a same measurement group, cells whose differences between the second measurement result and the first measurement result fall within a same difference range.

In an optional implementation, the processor is specifically configured to divide all the neighboring cells detected on the same measurement frequency into the at least two measurement groups based on a preset quantity of groups and a preset grouping method on each measurement frequency.

In an optional implementation, the processor is further configured to: before the terminal device divides all the neighboring cells detected on the same measurement frequency into the at least two measurement groups, obtain, by the terminal device, the one or more measurement results obtained by performing RRM measurement on all the neighboring cells detected on the same measurement frequency, so that when the terminal device divides all the detected neighboring cells into the at least two measurement groups based on the one or more measurement results, a difference between measurement results of neighboring cells in a same measurement group falls within a specified range.

In an optional implementation, the grouping configuration information further includes a maximum quantity of cells in a specific measurement group, and the specific measurement group is a measurement group on which the terminal device performs RRM measurement with highest power consumption among the at least two measurement groups.

In an optional implementation, the processor is specifically configured to: when determining that a measurement result of RRM measurement on the serving cell is greater than a first specified threshold, divide all the neighboring cells detected on the same measurement frequency into the at least two measurement groups, or when determining that a difference between measurement results of two consecutive times of RRM measurement on the serving cell is less than a second specified threshold, divide, by the terminal device, all the neighboring cells detected on the same measurement frequency into the at least two measurement groups.

In an optional implementation, the RRM measurement parameter includes at least one of a measurement period, an SMTC period, a measurement moment in an SMTC window, a maximum quantity of to-be-reported beams in each cell, a parameter indicating whether to report a beam-level measurement result, and a report interval.

Figure 8:
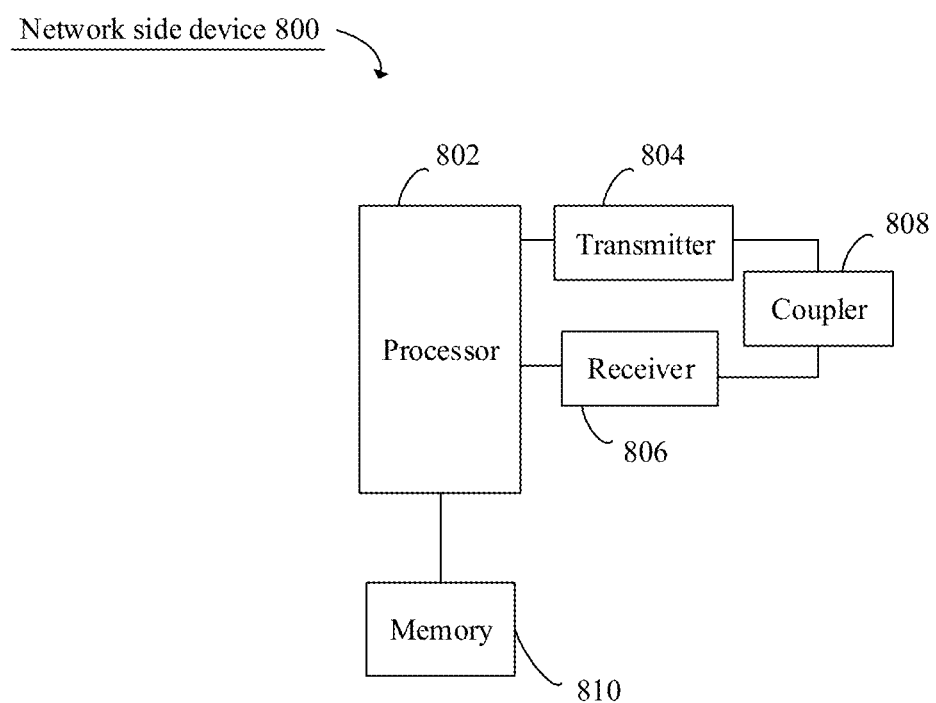
FIG. 8 is a schematic diagram depicting a structure of a network side device according to an embodiment of this application.

As shown in FIG. 8, an embodiment of this application further provides a network side device.

A network side device 800 may include a processor 802, a transceiver (which may be a complete module formed after a transmitter 804 and a receiver 806 are integrated, or the transmitter 804 and the receiver 806 may respectively implement a transmit function and a receive function), a coupler 808, and a memory 810. In some embodiments of this application, these components may be connected by using a bus or in another manner. A bus connection is used as an example in FIG. 8.

The coupler 808 is configured to: divide communication signals into a plurality of paths, and allocate the plurality of paths of communication signals to a plurality of receivers 806.

The transmitter 804 is configured to transmit a communication signal generated by the processor 802, and the receiver 806 is configured to receive the communication signal. In specific implementation, there may be one or more transmitters 804 or receivers 806.

The memory 810 is configured to store instructions. In specific implementation, the memory 810 may be a read-only memory (read-only memory, ROM), and the read-only memory may be configured to store instructions.

The processor 802 is configured to perform radio channel management. In this embodiment of this application, the processor 802 may be further configured to invoke the instructions stored in the memory 810, to perform the following step:

sending grouping configuration information to a terminal device, where the grouping configuration information is used to indicate the terminal device to divide all neighboring cells detected on a same measurement frequency into at least two measurement groups, the at least two measurement groups are in a one-to-one correspondence with at least two RRM measurement parameters, and the terminal device has different power consumption when performing RRM measurement on the at least two measurement groups based on the corresponding RRM measurement parameters.

In an optional implementation, the network side device includes:

When a quantity of measurement groups that correspond to each measurement frequency is the same, the grouping configuration information includes one piece of neighboring cell quantity information, the neighboring cell quantity information is used to indicate a quantity of neighboring cells included in each of at least two measurement groups corresponding to one measurement frequency, and the neighboring cell quantity information is shared by a plurality of measurement frequencies to be measured by the terminal device; or the grouping configuration information includes a plurality of pieces of neighboring cell quantity information, and the plurality of pieces of neighboring cell quantity information are in a one-to-one correspondence with a plurality of measurement frequencies to be measured by the terminal device.

When a quantity of measurement groups that correspond to each measurement frequency is not the same, the grouping configuration information includes a plurality of pieces of neighboring cell quantity information, and the plurality of pieces of neighboring cell quantity information are in a one-to-one correspondence with a plurality of measurement frequencies to be measured by the terminal device.

In an optional implementation, the grouping configuration information includes one or more thresholds, the one or more thresholds are used to indicate a plurality of threshold intervals, and the terminal device divides all the neighboring cells into the at least two measurement groups based on the grouping configuration information and the one or more measurement results obtained by performing RRM measurement on all the neighboring cells detected on the same measurement frequency, where measurement results of neighboring cells in a same measurement group correspond to a same threshold interval.

In an optional implementation, the grouping configuration information includes one or more offset values, the one or more offset values are used to indicate a plurality of difference ranges, and the terminal device groups, into a same measurement group based on the one or more offset values, cells whose differences between a first measurement result of RRM measurement on a serving cell of the terminal device and second measurement results of all the neighboring cells detected on the same measurement frequency fall within a same difference range.

In an optional implementation, the grouping configuration information further includes a maximum quantity of cells in a specific measurement group, and the specific measurement group is a measurement group on which the terminal device performs RRM measurement with highest power consumption among the at least two measurement groups.

In an optional implementation, the at least two measurement groups correspond to different RRM measurement parameters, and the RRM measurement parameter includes at least one of a measurement period, an SMTC period, a measurement moment in an SMTC window, a maximum quantity of to-be-reported beams in each cell, a parameter indicating whether to report a beam-level measurement result, and a report interval.

An embodiment of this application further provides a measurement apparatus, including:
a grouping unit, configured to divide all neighboring cells detected on a same measurement frequency into at least two measurement groups; and
a measurement unit, configured to perform RRM measurement separately on the at least two measurement groups based on an RRM measurement parameter corresponding to each measurement group, where the at least two measurement groups are in a one-to-one correspondence with at least two RRM measurement parameters, and the terminal device has different power consumption when performing RRM measurement on the at least two measurement groups based on the corresponding RRM measurement parameters.

An embodiment of this application further provides a measurement apparatus, including:
an information determining unit, configured to determine grouping configuration information; and
a sending unit, configured to send the grouping configuration information to a terminal device, where the grouping configuration information is used to indicate the terminal device to divide all neighboring cells detected on a same measurement frequency into at least two measurement groups, the at least two measurement groups are in a one-to-one correspondence with at least two RRM measurement parameters, and the terminal device has different power consumption when performing RRM measurement on the at least two measurement groups based on the corresponding RRM measurement parameters.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive solid-state drive (SSD)), or the like.

The methods described in the present invention are not limited to the embodiments described in the Description of Embodiments. Another implementation obtained by a person skilled in the art according to the technical solutions of the present invention still belongs to the technical innovation scope of the present invention.

Obviously, a person skilled in the art can make various modifications and variations to the present invention without departing from the scope of the present invention. The present invention is intended to cover these modifications and variations provided that these modifications and variations fall within the scope of protection defined by the following claims and their equivalent technologies.

What is claimed is:

1. A measurement method, wherein the method comprises:
dividing, by a terminal device, all neighboring cells detected on a same measurement frequency into at least two measurement groups; and
performing, by the terminal device, radio resource management (RRM) measurement separately on the at least two measurement groups based on at least two corresponding RRM measurement parameters, wherein
the at least two measurement groups are in a one-to-one correspondence with the at least two corresponding RRM measurement parameters, and
the terminal device has different power consumption when performing RRM measurement on the at least two measurement groups based on the at least two corresponding RRM measurement parameters,
wherein each of the at least two corresponding RRM measurement parameters comprises at least one of a measurement period, a synchronization signal/physical broadcast channel (SS/PBCH) block measurement time configuration (SMTC) period, a measurement moment in an SMTC window, a maximum quantity of to-be-reported beams in each cell, a parameter indicating whether to report a beam-level measurement result, or a report interval.

2. The method according to claim 1, wherein the dividing comprises:
dividing, by the terminal device, all the neighboring cells detected on the same measurement frequency into the at least two measurement groups based on grouping configuration information sent by a network side device.

3. The method according to claim 2, wherein
when a quantity of measurement groups corresponding to each measurement frequency among a plurality of measurement frequencies to be measured by the terminal device is the same,
the grouping configuration information comprises one piece of neighboring cell quantity information indicating a quantity of neighboring cells in each of at least two measurement groups corresponding to one measurement frequency, and the one piece of neighboring cell quantity information is shared by the plurality of measurement frequencies to be measured by the terminal device; or
the grouping configuration information comprises a plurality of pieces of neighboring cell quantity information, and the plurality of pieces of neighboring cell quantity information are in a one-to-one correspondence with the plurality of measurement frequencies to be measured by the terminal device; or
when a quantity of measurement groups corresponding to each measurement frequency among the plurality of measurement frequencies is not the same, the grouping configuration information comprises a plurality of pieces of neighboring cell quantity information, and the plurality of pieces of neighboring cell quantity information are in a one-to-one correspondence with the plurality of measurement frequencies to be measured by the terminal device.

4. The method according to claim 2, wherein
the grouping configuration information comprises one or more thresholds indicating a plurality of threshold intervals, and
the dividing comprises:
obtaining, by the terminal device, one or more measurement results by performing RRM measurement on all the neighboring cells detected on the same measurement frequency; and
dividing, by the terminal device, all the detected neighboring cells into the at least two measurement groups based on the one or more measurement results and the plurality of threshold intervals, wherein measurement results of neighboring cells in a same measurement group among the at least two measurement groups correspond to a same threshold interval among the plurality of threshold intervals.

5. The method according to claim 2, wherein
the grouping configuration information comprises one or more offset values indicating a plurality of difference ranges, and
the dividing comprises:
determining, by the terminal device, a first measurement result of RRM measurement on a serving cell and second measurement results of RRM measurement on all the neighboring cells detected on the same measurement frequency; and
dividing, by the terminal device, into a same measurement group among the at least two measurement groups, neighboring cells whose differences between the second measurement results and the first measurement result fall within a same difference range among the plurality of difference ranges.

6. The method according to claim 1, wherein
the dividing comprises:
dividing, by the terminal device, all the neighboring cells detected on the same measurement frequency into the at least two measurement groups based on a preset quantity of groups and a preset grouping method on each measurement frequency.

7. The method according to claim 1, wherein the dividing is performed by the terminal device
upon the terminal device determining that a measurement result of RRM measurement on a serving cell is greater than a first specified threshold, or
upon the terminal device determining that a difference between measurement results of two consecutive times of RRM measurement on the serving cell is less than a second specified threshold.

8. A measurement method, wherein the method comprises:
sending, by a network side device, grouping configuration information to a terminal device, wherein
the grouping configuration information indicates the terminal device to divide all neighboring cells detected on a same measurement frequency into at least two measurement groups,
the at least two measurement groups are in a one-to-one correspondence with at least two corresponding radio resource management (RRM) measurement parameters, and
the at least two corresponding RRM measurement parameters correspond to different power consumption the terminal device has when performing RRM measurement separately on the at least two measurement groups based on the at least two corresponding RRM measurement parameters,
wherein each of the at least two corresponding RRM measurement parameters comprises at least one of a measurement period, a synchronization signal/physical broadcast channel (SS/PBCH) block measurement time configuration (SMTC) period, a measurement moment in an SMTC window, a maximum quantity of to-be-reported beams in each cell, a parameter indicating whether to report a beam-level measurement result, or a report interval.

9. The method according to claim 8, wherein
when a quantity of measurement groups corresponding to each measurement frequency among a plurality of measurement frequencies to be measured by the terminal device is the same,
the grouping configuration information comprises one piece of neighboring cell quantity information indicating a quantity of neighboring cells in each of at least two measurement groups corresponding to one measurement frequency, and the one piece of neighboring cell quantity information is shared by the plurality of measurement frequencies to be measured by the terminal device; or
the grouping configuration information comprises a plurality of pieces of neighboring cell quantity information, and the plurality of pieces of neighboring cell quantity information are in a one-to-one correspondence with the plurality of measurement frequencies to be measured by the terminal device; or when a quantity of measurement groups corresponding to each measurement frequency among the plurality of measurement frequencies is not the same, the grouping configuration information comprises a plurality of pieces of neighboring cell quantity information, and the plurality of pieces of neighboring cell quantity information are in a one-to-one correspondence with the plurality of measurement frequencies to be measured by the terminal device.

10. The method according to claim 8, wherein
the grouping configuration information comprises one or more thresholds indicating a plurality of threshold intervals to be used by the terminal device to divide all the neighboring cells into the at least two measurement groups based on (i) the grouping configuration information and (ii) one or more measurement results obtained by performing RRM measurement on all the neighboring cells detected on the same measurement frequency,
wherein measurement results of neighboring cells in a same measurement group among the at least two measurement groups correspond to a same threshold interval among the plurality of threshold intervals.

11. The method according to claim 8, wherein
the grouping configuration information comprises one or more offset values indicating a plurality of difference ranges to be used by the terminal device to divide all the neighboring cells into the at least two measurement groups based on (i) the grouping configuration information, (ii) a first measurement result of RRM measurement on a serving cell and (iii) second measurement results of RRM measurement on all the neighboring cells detected on the same measurement frequency,
wherein neighboring cells divided into a same measurement group among the at least two measurement groups have differences between the second measurement results and the first measurement result within a same difference range among the plurality of difference ranges.

12. A terminal device, wherein the terminal device comprises:
a memory, configured to store instructions; and
a processor, configured to execute the instructions read from the memory, to:
divide all neighboring cells detected on a same measurement frequency into at least two measurement groups, and
perform radio resource management (RRM) measurement separately on the at least two measurement groups based on at least two corresponding RRM measurement parameters, wherein
the at least two measurement groups are in a one-to-one correspondence with the at least two corresponding RRM measurement parameters, and
the terminal device has different power consumption when performing RRM measurement on the at least two measurement groups based on the at least two corresponding RRM measurement parameters,
wherein each of the at least two corresponding RRM measurement parameters comprises at least one of a measurement period, a synchronization signal/physical broadcast channel (SS/PBCH) block measurement time configuration (SMTC) period, a measurement moment in an SMTC window, a maximum quantity of to-be-reported beams in each cell, a parameter indicating whether to report a beam-level measurement result, or a report interval.

13. The terminal device according to claim 12, wherein the processor is configured to divide all the neighboring cells detected on the same measurement frequency into the at least two measurement groups based on grouping configuration information sent by a network side device.

14. The terminal device according to claim 13, wherein
when a quantity of measurement groups corresponding to each measurement frequency among a plurality of measurement frequencies to be measured by the terminal device is the same,
the grouping configuration information comprises one piece of neighboring cell quantity information indicating a quantity of neighboring cells in each of at least two measurement groups corresponding to one measurement frequency, and the one piece of neighboring cell quantity information is shared by the plurality of measurement frequencies to be measured by the terminal device; or
the grouping configuration information comprises a plurality of pieces of neighboring cell quantity information, and the plurality of pieces of neighboring cell quantity information are in a one-to-one correspondence with the plurality of measurement frequencies to be measured by the terminal device; or
when a quantity of measurement groups corresponding to each measurement frequency among the plurality of measurement frequencies is not the same, the grouping configuration information comprises a plurality of pieces of neighboring cell quantity information, and the plurality of pieces of neighboring cell quantity information are in a one-to-one correspondence with the plurality of measurement frequencies to be measured by the terminal device.

15. The terminal device according to claim 13, wherein
the grouping configuration information comprises one or more thresholds indicating a plurality of threshold intervals, and
the processor is configured to:
obtain one or more measurement results by performing RRM measurement on all the neighboring cells detected on the same measurement frequency, and
divide all the neighboring cells into the at least two measurement groups based on the one or more measurement results and the plurality of threshold intervals, wherein measurement results of neighboring cells in a same measurement group among the at least two measurement groups correspond to a same threshold interval among the plurality of threshold intervals.

16. The terminal device according to claim 13, wherein
the grouping configuration information comprises one or more offset values indicating a plurality of difference ranges, and
the processor is configured to:
determine a first measurement result of RRM measurement on a serving cell and second measurement results of RRM measurement on all the neighboring cells detected on the same measurement frequency, and
divide, into a same measurement group among the at least two measurement groups, neighboring cells whose differences between the second measurement results and the first measurement result fall within a same difference range among the plurality of difference ranges.

17. The terminal device according to claim 12, wherein the processor is configured to divide all the neighboring cells detected on the same measurement frequency into the at least two measurement groups based on a preset quantity of groups and a preset grouping method on each measurement frequency.

18. The terminal device according to claim 12, wherein
the processor is configured to divide all the neighboring cells detected on the same measurement frequency into the at least two measurement groups:
upon determining that a measurement result of RRM measurement on a serving cell is greater than a first specified threshold, or
upon determining that a difference between measurement results of two consecutive times of RRM measurement on the serving cell is less than a second specified threshold.

* * * * *